Aug. 11, 1953     J. C. THOMPSON     2,648,275
BUN TOASTER
Filed Feb. 7, 1950     2 Sheets-Sheet 1
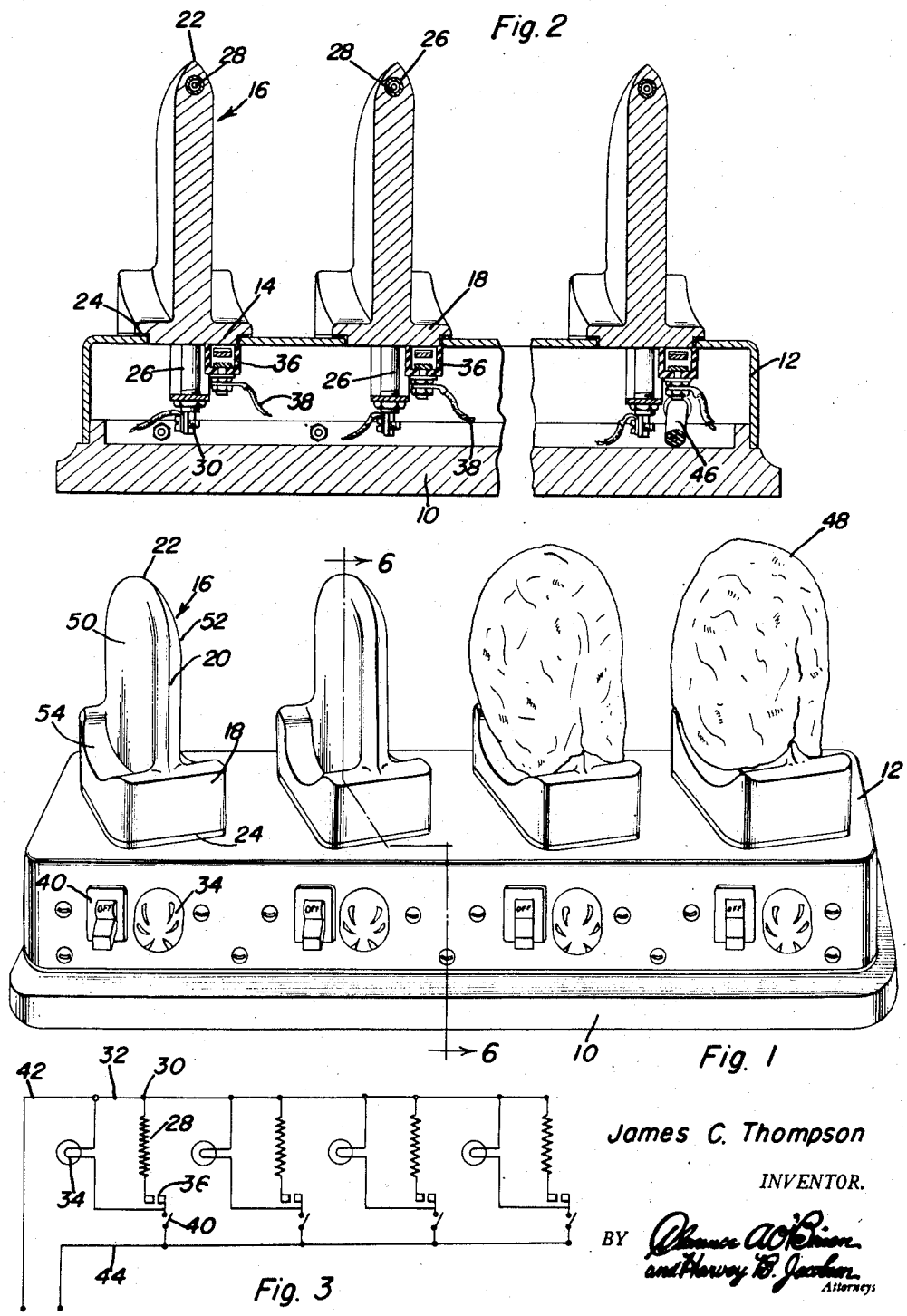
James C. Thompson
INVENTOR.

Aug. 11, 1953  J. C. THOMPSON  2,648,275
BUN TOASTER

Filed Feb. 7, 1950  2 Sheets-Sheet 2

James C. Thompson
INVENTOR.
BY
Attorneys

Patented Aug. 11, 1953

2,648,275

UNITED STATES PATENT OFFICE 2,648,275

BUN TOASTER

James C. Thompson, Fort Wayne, Ind., assignor to Man-U-Tech, Inc., Fort Wayne, Ind., a corporation of Indiana Application February 7, 1950, Serial No. 142,768

2 Claims. (Cl. 99—419)

This invention relates to an electrical appliance for toasting the inner surface of round type sandwich buns.

The primary object of this invention is to provide a toaster which is relatively simple in design and construction, attractive in appearance, and which includes a novel wedge-shaped, pointed toasting member including a heating element therein, which member can be employed to form a pocket in the bun and to toast the inner sides therein in such a manner that the two halves of the bun are not completely separated. In forcing the uncut bun onto the highly polished toasting member, the bread cells on the inside of the bun are smoothed in such a way that when toasted and removed, the pocket produced thereby has a glazed, moisture-tight surface which helps to keep a juicy filler added in the bun from soaking through the bun. Also, in toasting the inside only of the bun, the moisture that is in the bun steams through it to the outer surface, heating and softening the entire bun and making it soft and fresh as though it had been just freshly baked.

An important feature of this invention is the provision of a means on the lower end of the toasting member for urging the bottom end of the bun into positive engagement with the sides of the toasting member.

A further important feature of this invention is the provision of a wedge-shaped, arcuate, pointed toasting body fabricated of aluminum so that heat conduction to the inner sides of the bun would be at a maximum and the toasting body can be readily polished and cleaned. The toasting body will also prevent burning of the bun, since the latter will shrink away from the polished aluminum surface and only toasts when the bun is in contact with it.

Yet another feature of this invention is the provision of an insulating gasket between the toasting member and a base support to minimize heat transfer between the two members.

Yet another object of this invention is to provide a plurality of bun toasters electrically connected in parallel so that each bun toaster can be employed independently of the other, each bun toaster being connected in series with a switch, a thermostat for controlling the temperature of the heating element, and a pilot light on the base member indicating when the bun toaster is in use.

These, together with various ancillary objects and features of the invention which will later become apparent as the following description proceeds, are attained by the device, a preferred embodiment of which has been illustrated, by way of example only, in the accompanying drawings, wherein:

Figure 1 is a perspective view of an assembled battery of bun toasters;

Figure 2 is a vertical sectional view through the bun toaster shown in Figure 1;

Figure 3 is a wiring diagram illustrating the manner in which the elements of the toaster shown in Figures 1 and 2 are operatively connected to each other;

Specific reference will now be made to the drawings. In the several views, in the accompanying drawings and in the following specification, similar reference characters indicate corresponding elements throughout.

Figure 4:
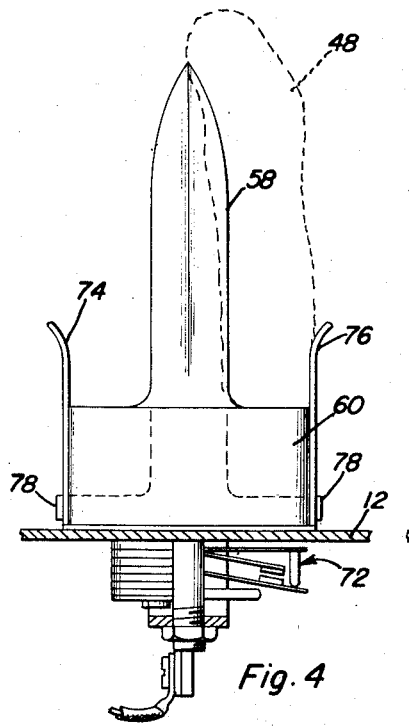
Figure 4 is a front elevational view of a modified form of a bun toaster.

Referring first to the modification shown in Figures 1 to 3 and 6, the present invention consists of a novel type bun toaster comprising a base member 10 of cast iron upon which is secured a preferably metallic hollow housing 12. Secured in appropriately spaced apertures in the upper wall of the housing are the lower ends 14 of toasting elements 16, the details of which will be described hereinafter.

Inasmuch as each toasting element or unit is the same in construction, shape and design, only one of these units will be described hereinafter. The toasting element 16 is fabricated of aluminum to provide maximum heat conduction to the bun and to permit for ready polishing and cleaning of the toasting member. This toasting member is an upstanding body having a relatively wide base 18 integral with a relatively flat vertical member 20 which is somewhat arcuated and includes a pointed ridge 22 at its top end. An insulating gasket 24 is interposed between the base member 18 and the housing 12 to minimize heat transfer from the toasting member 16 to the housing.

Cast into the toasting element is a steel sheath 26 in which is disposed a heating coil 28 which extends through the base member 18 and into the housing 12. One end of the heating coil 28 is secured, as at 30, to a conductive wire 32 which is in turn connected to a pilot light 34 mounted on the front panel of the housing 12. The other end of the heating unit is operatively connected to a conventional thermostat 36 which is in turn connected by means of a conductive wire 38 to an appropriate switch 40 also mounted on the front panel of the housing 12 and adjacent the pilot light 34. A conductive wire 42 is connected to the conductive wire 32 and to the heating coil 28 while another conductive wire 44 is operatively connected to the switch 40, the wires 42 and 44 being retained in an appropriate insulated cable 46 carrying a plug (not shown) adapted to be inserted in a socket leading to an electrical source (not shown). Thus, it will be seen that the heating coil 28 in each of the toaster elements 16 is operatively connected in series with a thermostat 36, a switch 40, and in parallel with a pilot light 34. As shown clearly in the wiring diagram of Figure 3, each of the bun toasting units are in turn operatively connected in parallel to each other so that each unit may be independently operated.

In the modification shown in Figures 1 to 3 and 6, the bun 48 is pushed down on the toasting element 16 without previous slicing, the pointed ridge 22 and the relatively flat dimension of the toasting element forcing the bun apart, as shown clearly in Figure 1. In order to urge the sides of the bun into positive contact with the sides 50 and 52 of the toaster element, the enlarged base member 18 is provided with arcuate recesses 54 and 56 on both sides of the toasting member, these recesses receiving the bottom open end side portions of the bun 48. Also, the bun is not completely separated in halves while being toasted and only the inner surfaces thereof are heated and toasted.

Figure 5:
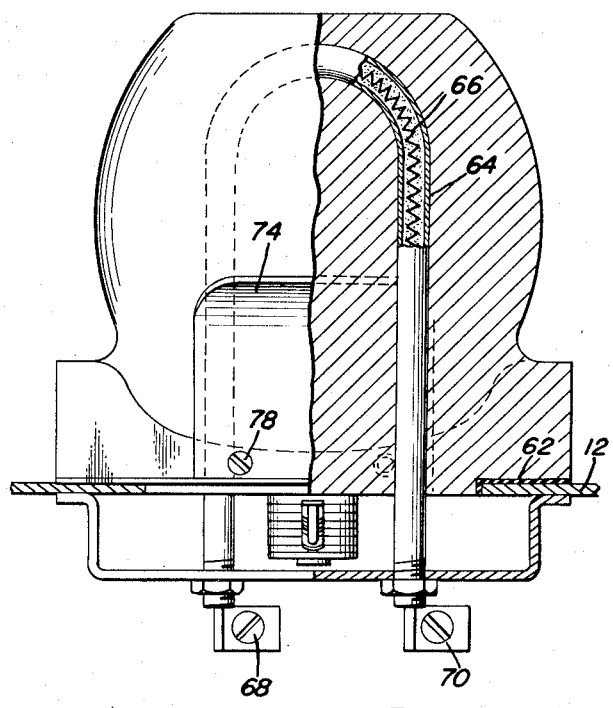
Figure 5 is a side elevational view of the bun toaster shown in Figure 4, parts being broken away and shown in section to illustrate details of construction.
Figure 6:
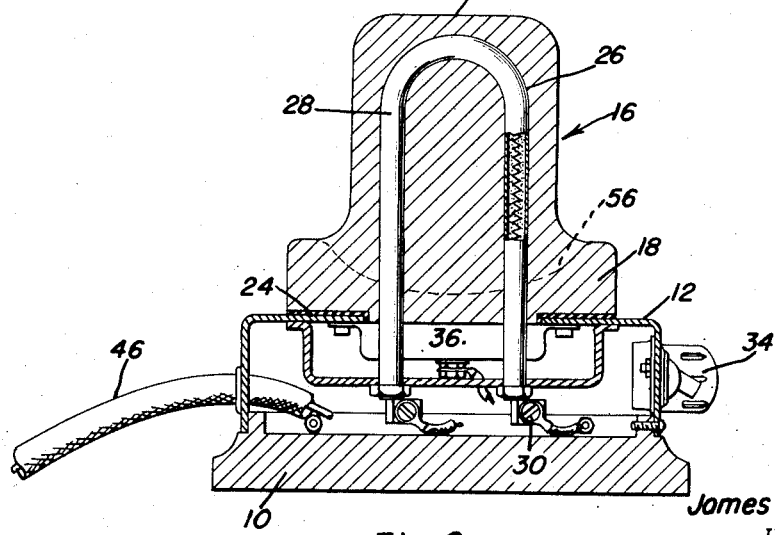
Figure 6 is a sectional view taken substantially in the plane of the section line 6—6 of Figure 1.

The modification shown in Figures 4 and 5 is similar to that shown in Figures 1 to 3 and 6 except that the thermostat is different and the means for positively urging the sides of the bun into engagement with the sides of the toasting element is also different. The toasting element 58 is also fabricated of aluminum and includes a relatively wide base 60 secured to the housing 12 and including an insulating gasket 62 interposed between the base 60 and the housing 12. Cast or inserted in the toasting element is a metallic sheath 64 carrying a heating coil 66 which extends into the housing 12 and is secured as at 68 and 70 to the switch means 40, the pilot light 34, and to a thermostat 72 which controls the temperature of the heating coil 66 by cutting the same on and off within a particular temperature range. The means for urging the sides of the bun into positive engagement with the sides of the toasting element 58 consists of spring fingers 74 and 76 secured as at 78 to the base member 60 and extending upwardly from the base member and on both sides of the toasting member 58. Thus, in this modification, when the bun 48 is first sliced partially and then suspended upon the toasting element 58, the spring fingers 74 and 76 urge the bottom side ends of the bun into positive engagement with the toasting member.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A toaster for insertion within a bun comprising an upright generally wedge-shaped member tapering to an edge at the top and the sides thereof for incising an end of the bun, said upright member having substantially arcuately depressed and outwardly directed lower areas terminating in an enlarged base member for limiting downward movement of the bun upon said upright member, and a substantially U-shaped integral resistance element marginally disposed within said toaster for variably heating the surfaces thereof, said arcuately depressed and outwardly directed areas tending initially to urge the interior of the bun against the sides of the upright member and subsequently to permit contraction of the bun endwise during the toasting process to draw the interior of the bun away from the sides of the toasting element to preclude over-toasting.

2. A toasting element for a bun toaster having an apertured housing for supporting the toasting element thereon, said toasting element being generally wedge-shaped and tapering to an edge at the top and sides thereof for incising and receiving a bun thereon, said toasting element comprising an upright member having substantially arcuately depressed and outwardly directed lower areas terminating in an enlarged base member for limiting downward movement of the bun upon said upright member, said base member being of greater dimension than the aperture in said housing, a substantially U-shaped integral resistance element marginally disposed within said toasting element and having a metal sheath thereabout, said sheath and said resistance element having terminal portions extending beyond said base and through said aperture, said terminal portions presenting areas receiving means for securing the enlarged base member of said heating element to said apertured housing and for connection to an electrical circuit.

JAMES C. THOMPSON.

References Cited in the file of this patent

UNITED STATES PATENTS

| Number | Name | Date |
|---|---|---|
| 987,058 | Fowler et al. | Mar. 14, 1911 |
| 1,162,537 | Yager | Nov. 30, 1915 |
| 1,341,084 | Spies | May 25, 1920 |
| 1,464,255 | Zimmermann | Aug. 7, 1923 |
| 1,564,681 | Kercher | Dec. 8, 1925 |
| 1,848,030 | Sibley | Mar. 1, 1932 |
| 1,992,270 | Wilkes | Feb. 26, 1935 |
| 2,016,655 | Scovereske | Oct. 8, 1935 |
| 2,080,171 | Fairbanks et al. | May 11, 1937 |
| 2,264,094 | McCullough | Nov. 25, 1941 |

FOREIGN PATENTS

| Number | Country | Date |
|---|---|---|
| 350,436 | Great Britain | June 5, 1931 |